Patented Jan. 8, 1929.

1,698,294

UNITED STATES PATENT OFFICE.

JOHN W. BECKMAN, OF OAKLAND, CALIFORNIA.

PROCESS OF EXTRACTING OILS.

No Drawing.   Application filed May 19, 1924. Serial No. 714,520.

REISSUED

My invention has for its principal object the disintegration of certain of the cellular constituents in life cells whereby the structure of the cell is loosened, dissolved, disintegrated or destroyed without any substantial change in certain other constituents.

A further object is the recovery of animal or vegetable oils from corresponding animal or vegetable cellular structures by destroying the other portions of the cellular structure whereby the oil contained in the life cells is freed from entrainment and may then be readily recovered by conventional means.

By life cells I wish to be understood as referring to oil bearing cellular structure generally which is the product of growth.

A further object of my invention is the treatment of animal or vegetable oil bearing wastes whereby the oils are readily abstracted therefrom.

A further object is the abstraction of essential oils from their appropriate raw materials.

A further object is the treatment of animal, fish and vegetable matter for the production of animal feed or fertilizer, which by my process has been separated from the oils which oil residues have heretofore turned such products rapidly rancid.

By the treatment with my process these are removed leaving a residue of solid matter which when dried will maintain its purity and sweetness unimpaired.

My invention is applicable to oil bearing cellular structure, the product of life generally and is thus generally applicable to vegetables, meats, fish and all organic cellular matter.

Other objects will appear from the specifications which follow.

These objects I attain by first preparing the material in a finely divided state and mix with sufficient water to make the mass of a mush-like consistency. I then mix with the mass a culture of the bacillus that produces lactic acid fermentation. I then maintain the mixture, preferably out of contact with the air by sealing with a layer of paraffine or paraffine paper or in suitable covered vessels, and at a temperature most favorable for the bacterial development and growth throughout the mass. In the case of lactic acid fermentation, this temperature I have found to be substantially 120 degrees F.

During the fermentation process and bacterial growth in the mixture, I supply or add thereto a reagent to maintain the mixture substantially neutral, that is to neutralize the lactic acid in the case of lactic fermentation as the acid is formed. The presence of lactic acid inhibits the growth of the bacteria and by its neutralization the fermentation is promoted to a greater degree than would occur, where the product of the action would otherwise retard or arrest the growth.

In the case of lactic fermentation I have found carbonate of lime or carbonate of magnesium to be suitable for neutralizing the lactic acid.

The residue after the abstraction of the oil may be boiled to sterilize it and arrest further action and dried and is particularly valuable as an animal food, being predigested and largely soluble and carrying a large percentage of proteins as amino-acids, soluble lactic acid salts, and soluble pentoses.

I have found that the time involved in the bacterial action may be reduced by initially adding approximately 10% chloride of sodium solution. This appears also to have a solvent action on the proteins as they occur or are formed or released thus freeing the surfaces to the action of the bacteria.

As an example of my process I will describe the abstraction of the fats and oils from cocoanut.

I first take the cocoanut, dried as copra or fresh as it comes from the tree, and grind, grate or otherwise disintegrate the mass into small particles. To 1000 parts of this material I add substantially 1 part of malt and 1 part of carbonate of magnesium as a neutralizing agent and a sufficient amount of water to make the entire mixture of mush-like consistency. The mixture is now brought to a temperature of 120 degrees F. At which fermentation progresses rapidly, and during this period I prefer to maintain the mixture in darkness or shadow and with an exclusion of air circulation, it is not necessary to exclude the air entirely, but it is advisable to cover the mixture to prevent excessive oxidation and absorption at the surface; the bacteria being in this case what is known as anaerobic.

The mixture may be tested from time to time for acidity, and further neutralizing agent added to maintain substantial neutrality. After a period of approximately 100 to 125 hours, the cellular structure will have been destroyed and the oil contents of the cells will have therefore been freed and will accumulate at the surface and within the body of the mixture. A slow stirring during this period will facilitate the flowing of the freed oil to the surface of the mixture and prevent its entanglement in the mass.

The water that was initially added may have contained a salt as sodium chloride; or a suitable salt, as sodium chloride, may now be added. This will have the effect of increasing the specific gravity of the water portion of the treated mixture, thus promoting the gravity separation of the oil and fat globules.

The sodium chloride also appears to have a solvent action on the proteins which in some cases is advantageous as is more fully set forth in my co-pending application Serial No. 714,519, filed May 19, 1924.

To further promote the floating of the oils water may be added preferably during the latter part of the fermentation period as a medium through which the oil particles will more readily float. In this way a very effective separation of the oil freed from the cells is secured at the top of the mixture, thus securing an initial separation of the freed oil in the same container and at the same time that the fermentation process is completed. It is to be noted that in my method the oil separation is secured at temperatures below 150° F. and which is believed to be below the critical temperature for vitamin destruction, thus retaining the vitamins in all of their purity.

After the above described treatment there will of course remain in the mass, although free from the cell structure, a considerable percentage of the oil which may be separated by any conventional method, pressing, centrifuging, etc. Separation in such case is accomplished with much greater ease and efficiency than where the oil globules are still retained within the cell walls, as heretofore. In the treatment of some cell structures which do not initially contain the ingredients most favorable to bacterial propagation it is advantageous to add hexoses in the form of cane sugar, molasses, starches or the like, depending on the individual case. These hexoses provide food and further propagation media to supplement that of the original cellular mixture and thus facilitate the dissemination of the bacteria and the bacterial action upon the initial mass.

In the specified case mentioned above, that of the treatment of copra, I have mentioned its inoculation from brewer's barley or malt as a supply of the necessary initial bacteria. There are, however, various other substances in which the lactic-acid-producing bacteria are readily available, any of which may be used with advantage, or a culture containing a predominance of the lactic-acid-producing-bacteria may be made, all in accordance with the judgment of the operator and the requirements of any individual case.

The quantity of bacteria culture employed for an inoculation is suitable over wide limits, as a very small quantity of bacteria is sufficient for the treatment of a very large mass because of its rapid growth through the mass. Thus an ounce of malt may be employed to inoculate a ton or more of the mixture, the only difference in the result being a slightly longer period of time required for the bacteria fully to disseminate through the mass and effect a complete action therein.

I claim:

1. The process of extracting oil from oil bearing animal and vegetable cellular substances which consists in macerating with water and inoculating the material with lactic-acid-producing-bacilli and then keeping the mixture at a temperature to promote the bacterial action and adding a re-agent to maintain the mixture substantially neutral as the bacterial action progresses whereupon the oil is released from the cells, then separating the oil from the treated mass.

2. The process of extracting oil from oil bearing animal and vegetable cellular substances which consists in macerating with water and inoculating the material with the lactic-acid-producing-bacilli and then keeping the mixture at a temperature of substantially 120 degrees F. to facilitate the bacterial action and adding a re-agent to maintain the mixture substantially neutral as the bacterial action progresses whereupon the oil is released from the cells, then separating the oil from the treated mass.

3. The process of extracting oil from oil bearing animal and vegetable cellular substances which consists in macerating with water and inoculating the material with the lactic-acid-producing-bacilli and then keeping the mixture at a temperature to promote the bacterial action and substantially neutralizing the lactic acid as formed whereupon the oil is released from the cells, then separating the oil from the treated mass.

4. The process of recovering oil from oil bearing animal and vegetable substances mechanically mixed with water which consists in inoculating the said mixture with lactic acid producing bacteria adding to said mixture an alkaline-earth carbonate in amount sufficient to neutralize the acid produced during bacterial action as it is formed as the bacterial action progresses thus preventing the otherwise toxic action of the acid on the bacteria and thereafter separating the oil released by said bacterial action from said substances.

5. The process of extracting oil from oil bearing animal and vegetable cellular substances which consists in macerating with water and inoculating the material with lactic-acid-producing-bacilli, maintaining the mixture at substantially 120° F. to facilitate the bacterial action and adding a re-agent to maintain the mixture substantially neutral as the bacterial action progresses whereupon oil is released from the cells and then separating out the oil.

6. The process of extracting oil from oil bearing animal and vegetable cellular substances which consists in macerating with water and inoculating the material with lactic-acid-producing-bacilli, introducing a neutralizing agent for the lactic acid which is formed, maintaining the mixture at substantially 120° F. whereupon the cellular structure is destroyed by the continued action of the bacilli and the oil is released from the cells and separates by gravity.

7. The process set forth in claim 3 wherein the neutralizing agent is magnesium carbonate.

8. The process set forth in claim 6 wherein the neutralizing agent is magnesium carbonate.

9. The process of extracting oil from oil bearing animal and vegetable cellular substances which consists in macerating with water and inoculating the material with lactic-acid-producing-bacilli, and adding a hexose to promote the bacterial growth, introducing a neutralizing agent for the lactic acid, which is formed, maintaining the mixture at substantially 120° F. whereupon the cellular structure is destroyed by the continued action of the bacilli and the oil is released from the cells and separates by gravity.

10. The process set forth in claim 9 wherein the neutralizing agent is magnesium carbonate.

11. The process of extracting oil from oil-bearing animal and vegetable material which consists in macerating said material, diluting it with water until the mixture is of the consistency of mush, adding a culture of lactic acid bacteria thereto and heating it to 120° F., while adding a neutralizing agent periodically in quantities sufficient to substantially neutralize the lactic acid formed, until the cellular structure of the material is substantially destroyed and the oil freed therefrom, then adding water to thin the mixture sufficiently to permit the oil to separate by gravity therefrom, and drawing off the oil.

JOHN W. BECKMAN.